United States Patent
Woo et al.

(10) Patent No.: US 12,491,662 B2
(45) Date of Patent: Dec. 9, 2025

(54) MINUTE CUTTING APPARATUS FOR SUPER ABSORBENT POLYMER HYDROGEL USING PUMP

(71) Applicant: LG CHEM, LTD., Seoul (KR)

(72) Inventors: Heechang Woo, Daejeon (KR); Yoon Jae Min, Daejeon (KR); Gicheul Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 436 days.

(21) Appl. No.: 17/642,806

(22) PCT Filed: Oct. 16, 2020

(86) PCT No.: PCT/KR2020/014189
§ 371 (c)(1),
(2) Date: Mar. 14, 2022

(87) PCT Pub. No.: WO2021/075921
PCT Pub. Date: Apr. 22, 2021

(65) Prior Publication Data
US 2022/0379521 A1    Dec. 1, 2022

(30) Foreign Application Priority Data

Oct. 18, 2019  (KR) ........................ 10-2019-0130240
Oct. 16, 2020  (KR) ........................ 10-2020-0134112

(51) Int. Cl.
*B29B 9/06*      (2006.01)
*B01J 20/28*    (2006.01)
(Continued)

(52) U.S. Cl.
CPC .......... *B29B 9/06* (2013.01); *B01J 20/28047* (2013.01); *B02C 18/14* (2013.01); *B02C 18/24* (2013.01);
(Continued)

(58) Field of Classification Search
CPC ..................................................... B02C 18/14
See application file for complete search history.

(56) References Cited

U.S. PATENT DOCUMENTS 7,591,974 B2      9/2009  Savich et al.
2009/0022603 A1   1/2009  Feise et al.
(Continued)

FOREIGN PATENT DOCUMENTS

CN       203357498 U    12/2013
CN       204278300 U     4/2015
(Continued)

OTHER PUBLICATIONS

Extended European Search Report dated Aug. 12, 2022 issued in the European Patent Application No. 20876176.7.
(Continued)

*Primary Examiner* — Susan D Leong
*Assistant Examiner* — Vipul Malik
(74) *Attorney, Agent, or Firm* — Morgan, Lewis & Bockius LLP

(57) ABSTRACT

A minute cutting apparatus for a superabsorbent polymer hydrogel using a pump is disclosed. An embodiment of the present invention provides the minute cutting apparatus, including: a barrel body in which a transfer space through which the hydrogel is transferred is formed; a pumping unit installed in the barrel body to supply a pressing force to the transfer space, a rotation shaft rotatably installed in the transfer space of the barrel body; a driving motor configured to provide a rotational driving force to rotation shaft; a cutter member installed on the rotation shaft to pulverize the hydrogel transferred by the pressing force in the transfer space; and a perforated plate installed in the barrel body to discharge the hydrogel pulverized by the cutter member to an outside of the barrel body.

11 Claims, 4 Drawing Sheets

(51) Int. Cl.
    *B02C 18/14*        (2006.01)
    *B02C 18/24*        (2006.01)
    *B29B 7/42*         (2006.01)
    *B29B 9/12*         (2006.01)

(52) U.S. Cl.
    CPC .................. *B29B 7/42* (2013.01); *B29B 9/12* (2013.01); *B01J 2220/68* (2013.01)

(56) References Cited

U.S. PATENT DOCUMENTS

| | | | |
|---|---|---|---|
| 2011/0275860 A1 | 11/2011 | Beldring et al. | |
| 2012/0328723 A1 | 12/2012 | Savich et al. | |
| 2013/0285276 A1* | 10/2013 | Ahlgrimm ............ | B29C 48/405 264/141 |
| 2015/0322180 A1 | 11/2015 | Matsumoto et al. | |
| 2016/0199529 A1* | 7/2016 | Torii ........................ | B29B 9/12 428/402 |
| 2017/0216817 A1 | 8/2017 | Torii et al. | |
| 2019/0275192 A1 | 9/2019 | Torii et al. | |
| 2019/0329219 A1 | 10/2019 | Watabe et al. | |
| 2019/0329220 A1 | 10/2019 | Watabe et al. | |
| 2022/0203375 A1 | 6/2022 | Woo | |

FOREIGN PATENT DOCUMENTS

| | | | | |
|---|---|---|---|---|
| CN | 204701022 U | | 10/2015 | |
| CN | 204869324 A | | 12/2015 | |
| CN | 105492505 A | | 4/2016 | |
| CN | 206030293 U | * | 3/2017 | |
| CN | 207736564 U | * | 8/2018 | |
| CN | 208052339 U | * | 11/2018 | |
| CN | 108995082 A | * | 12/2018 | ............. B29B 17/00 |
| CN | 109366786 A | * | 2/2019 | ............... B29B 9/06 |
| CN | 208975987 U | | 6/2019 | |
| CN | 110328773 A | * | 10/2019 | |
| EP | 3543279 A1 | | 9/2019 | |
| EP | 3939756 A1 | | 1/2022 | |
| EP | 3984711 A1 | | 4/2022 | |
| JP | 2002-177807 A | | 6/2002 | |
| JP | 2003-137922 A | | 5/2003 | |
| JP | 2009-529600 A | | 8/2009 | |
| JP | 5759384 B2 | | 8/2015 | |
| JP | 5883948 B2 | | 3/2016 | |
| KR | 10-2001-0001663 A | | 1/2001 | |
| KR | 10-2016-0048843 A | | 5/2016 | |
| KR | 10-2017-0063818 A | | 6/2017 | |
| KR | 10-1847180 B1 | | 4/2018 | |
| WO | WO-2016105119 A1 | * | 6/2016 | ........... B02C 18/302 |
| WO | WO-2019102107 A1 | * | 5/2019 | ............. B29B 13/06 |

OTHER PUBLICATIONS

International Search Report (with partial translation) and Written Opinion dated Jan. 29, 2021 for corresponding International Patent Application No. PCT/KR2020/014189.

* cited by examiner

[Figure 1]
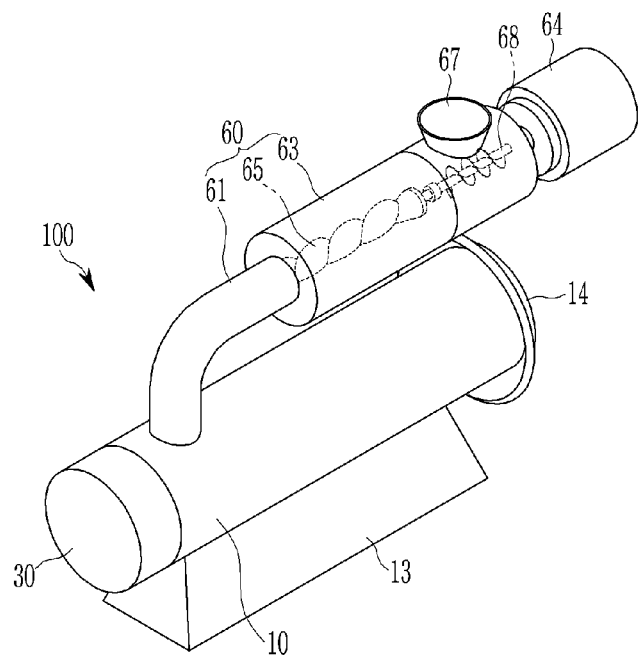
[Figure 2]
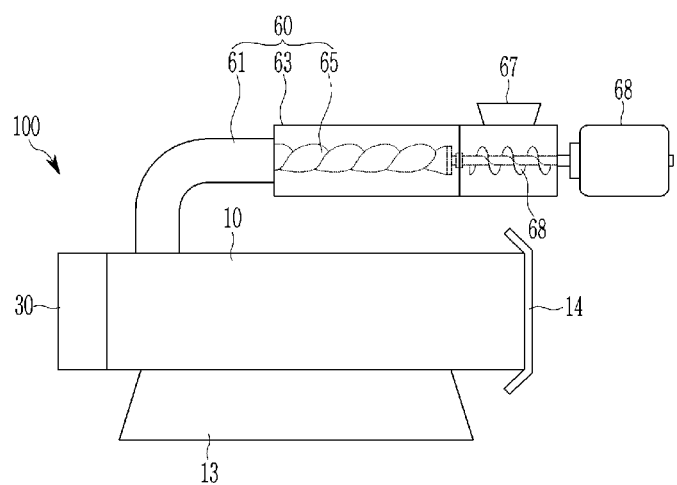

【Figure 3】
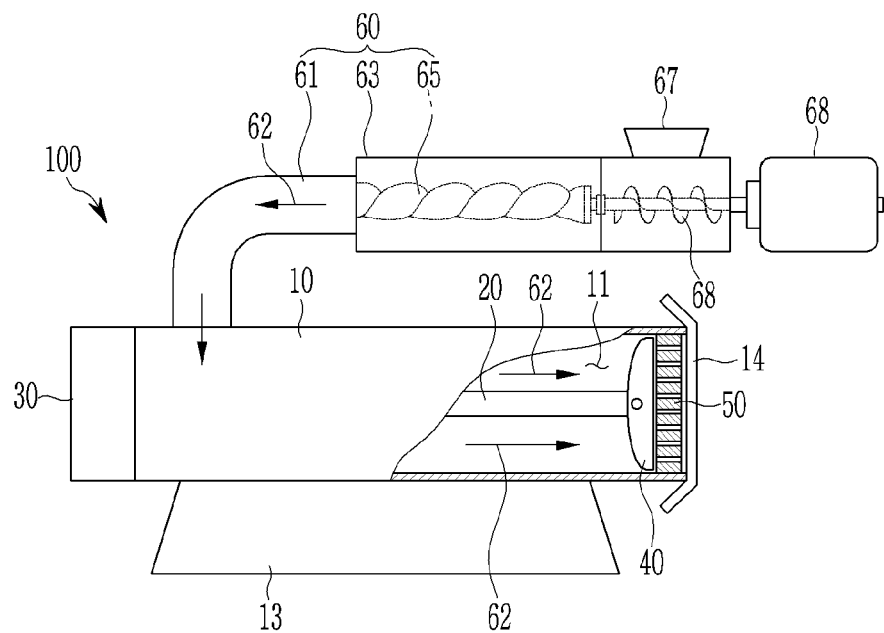
【Figure 4】
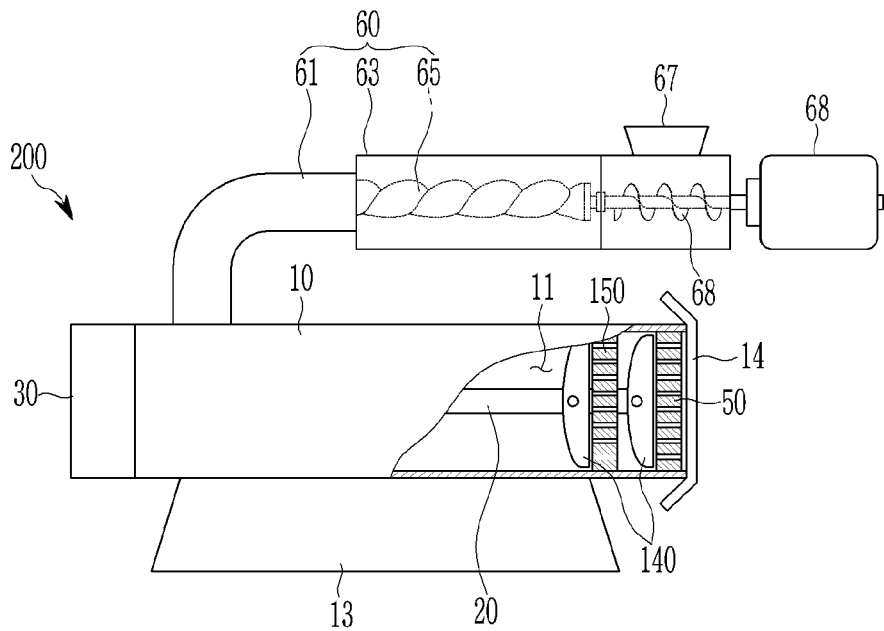

【Figure 5】
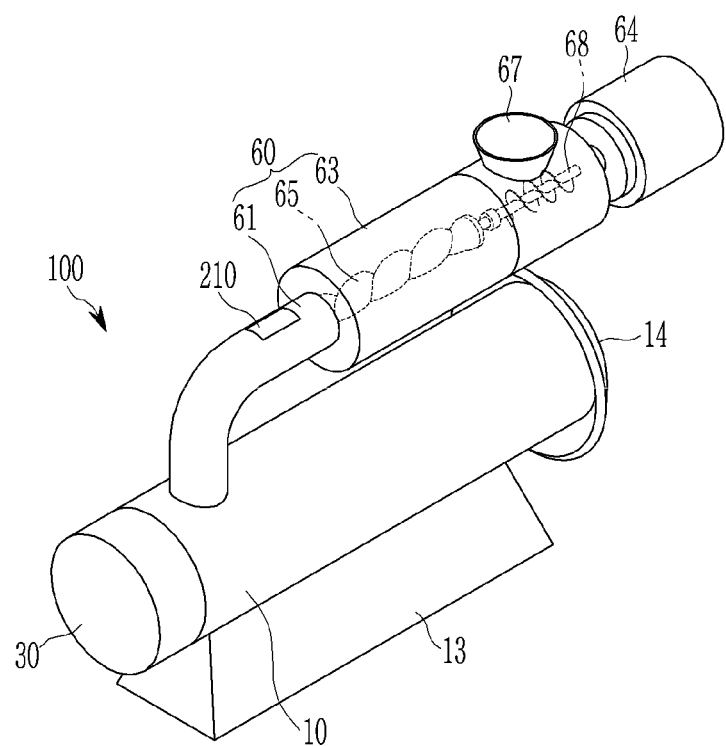

【Figure 6】
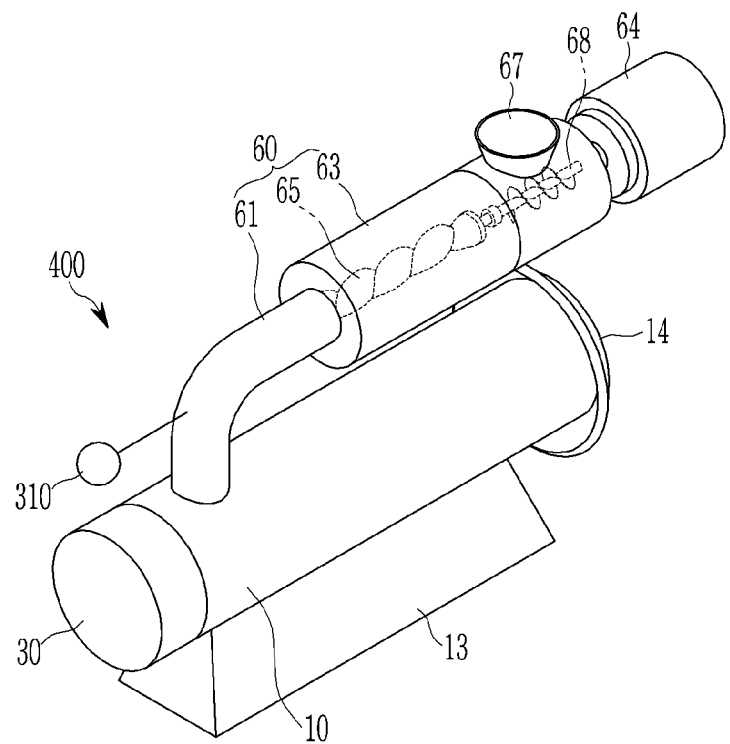
【Figure 7】
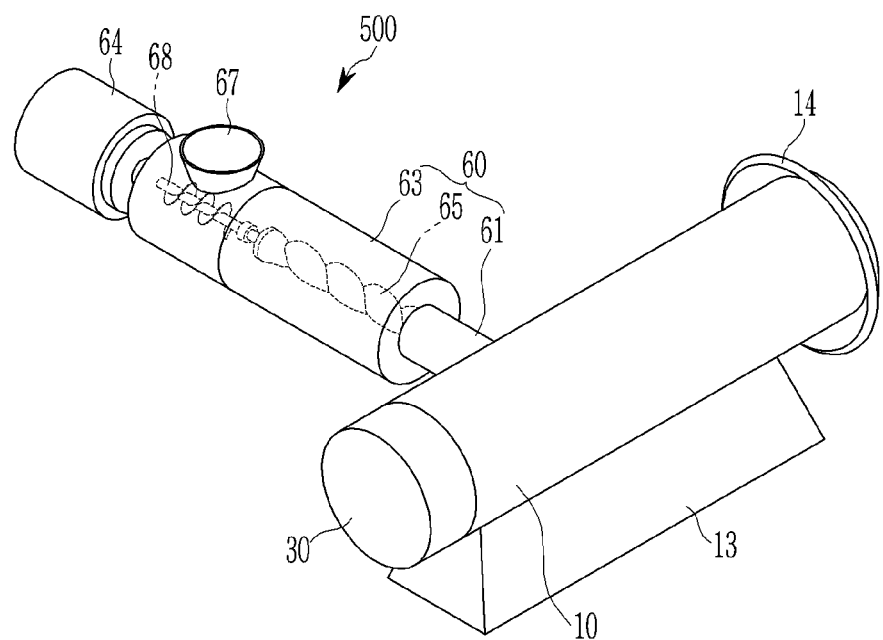

MINUTE CUTTING APPARATUS FOR SUPER ABSORBENT POLYMER HYDROGEL USING PUMP

TECHNICAL FIELD

Mutual Citation with Related Applications

This application claims priority to and the benefit of Korean Patent Application No. 10-2019-0130240, filed in the Korean Intellectual Property Office on Oct. 18, 2019, and Korean Patent Application No. 10-2020-0134112, filed in the Korean Intellectual Property Office on Oct. 16, 2020, the entire contents of which are incorporated herein by reference.

The present invention relates to a minute cutting apparatus for a super absorbent polymer hydrogel using a pump, which uniformly cuts the hydrogel.

BACKGROUND ART

A super absorbent polymer (SAP) is a synthetic polymer material with a function of being capable of absorbing moisture of 500 to 1000 times its own weight, and is referred to as a super absorbency material (SAM), an absorbent gel material (AGM), or the like by each developer. The above-described super absorbent polymer has begun to be put into practical use as a sanitary product, and is currently widely used as a material such as a soil repair agent for gardening, a water supply material for civil works or construction, a sheet for seedlings, a freshness maintenance agent in the food distribution field, and a material for a poultice in addition to hygiene products such as paper diapers for children.

A hydrogel or hydrogel polymer obtained through the polymerization reaction as described above is generally pulverized after a drying process and then is commercially available as a powdery product is known. It is important to increase the surface area of the hydrogel polymer as much as possible in order to efficiently perform the drying step. Accordingly, a method of increasing a surface area of the hydrogel polymer to be dried by simply pulverizing the hydrogel polymer that is polymerized through thermal polymerization or photopolymerization may be considered in order to increase the surface area of the hydrogel polymer before the drying process as much as possible. A process of first pulverizing the hydrogel polymer after polymerization has been disclosed in order to increase the surface area of the hydrogel polymer as described above.

A chopper is mainly used in the first pulverizing process of the hydrogel.

Such a chopper includes a screw for moving the hydrogel, a barrel including a spiral, a cutter blade for cutting the hydrogel, and a perforated plate from which the cut hydrogel is discharged.

In such a conventional chopper, a moving direction of hydrogel particles injected into a barrel and a screw is horizontal. Accordingly, a pressure applied to the hydrogel particles at the position where a perforated plate is positioned is not uniform, and a working pressure at a lower position of the barrel is greater than that at an upper portion thereof, so that uniform cutting is not performed in the perforated plate.

As described above, when sizes of the minutely cut particles of the hydrogel are not uniform, non-uniform drying may occur for each particle during a drying process of the hydrogel, resulting in excessive drying or under-drying.

Herein, the excessively dried product of the hydrogel may generate a large amount of fine powder in a preparing process of the super absorbent polymer, thereby causing a problem in the preparing process. In addition, the under-dried product of the hydrogel has a problem in that it is difficult to prepare a smooth super absorbent polymer in processes such as pulverization or classification as well as physical properties of the prepared super absorbent polymer.

DISCLOSURE

Technical Problem

An embodiment of the present invention has been made in an effort to provide a minute cutting apparatus for a super absorbent polymer hydrogel using a pump, that is capable of uniform cutting of the hydrogel, thereby improving manufacturing quality of the super absorbent polymer.

Technical Solution

An embodiment of the present invention provides a minute cutting apparatus for a super absorbent polymer hydrogel using a pump, including: a barrel body in which a transfer space through which the hydrogel is transferred is formed; a pumping unit installed in the barrel body to supply a pressing force to the transfer space, a rotation shaft rotatably installed in the transfer space of the barrel body; a driving motor configured to provide a rotational driving force to the rotation shaft; a cutter member installed on the rotation shaft to pulverize the hydrogel transferred by the pressing force in the transfer space; and a perforated plate installed in the barrel body to discharge the hydrogel pulverized by the cutter member to an outside of the barrel body.

The barrel body may have a transfer space in which the hydrogel is transferred, and the pumped pressing force may be supplied to an inside of the transfer space by being connected to the pumping unit at an upper portion thereof.

The pumping unit may include: a connection passage installed on an upper portion of the barrel body to be in communication with the transfer space; a body portion fixedly installed in the connection passage; and a spiral rotor portion rotatably installed inside the body portion to provide a pressing force to the connection passage.

An injection hopper into which the hydrogel is injected may be installed at an upper portion of the body portion.

A plurality of cutter members and a plurality of perforated plates may be continuously installed on the rotation shaft.

A display window capable of checking an inside may be installed in the connection passage.

The minute cutting apparatus may further include a pressure sensor installed in the connection passage to sense whether or not an internal pressure is within a predetermined pressure range.

Advantageous Effects

According to an embodiment of the present invention, the hydrogel may be pressed against the side surface of the perforated plate while being filled in an entirely uniform state in the inner space of the barrel body by the pumping force of the pump unit. Accordingly, the hydrogel is uniformly pressed over an entire side area of the perforated plate, and thus the hydrogel may be cut in a uniformly pressed state, thereby improving preparing quality of the super absorbent polymer.

DESCRIPTION OF THE DRAWINGS

FIG. 1 illustrates a schematic perspective view of a minute cutting apparatus for a super absorbent polymer hydrogel using a pump according to a first embodiment of the present invention.

FIG. 2 illustrates a schematic side view showing the minute cutting apparatus of FIG. 1.

FIG. 3 illustrates a schematic exploded side view of main parts showing the minute cutting apparatus of FIG. 2.

FIG. 4 illustrates a schematic exploded side view of main parts showing a minute cutting apparatus for a super absorbent polymer hydrogel using a pump according to a second embodiment of the present invention.

FIG. 5 illustrates a schematic perspective view of a minute cutting apparatus for a super absorbent polymer hydrogel using a pump according to a third embodiment of the present invention.

FIG. 6 illustrates a schematic perspective view of a minute cutting apparatus for a super absorbent polymer hydrogel using a pump according to a fourth embodiment of the present invention.

FIG. 7 illustrates a schematic perspective view of a minute cutting apparatus for a super absorbent polymer hydrogel using a pump according to a fifth embodiment of the present invention.

MODE FOR INVENTION

Hereinafter, the present invention will be described more fully with reference to the accompanying drawings, in which embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

A minute cutting apparatus for a super absorbent polymer hydrogel using a pump, which is described below, may be installed to improve physical properties by more precisely forming the super absorbent polymer into a particle shape. This will be described in detail below with reference to the drawings.

FIG. 1 illustrates a schematic perspective view of a minute cutting apparatus for a super absorbent polymer hydrogel using a pump according to a first embodiment of the present invention, FIG. 2 illustrates a schematic side view showing the minute cutting apparatus of FIG. 1, and FIG. 3 illustrates a schematic exploded side view of main parts showing the minute cutting apparatus of FIG. 2.

As illustrated in FIG. 1 to FIG. 3, according to the first embodiment of the present invention, the minute cutting apparatus for the super absorbent polymer hydrogel using the pump includes a barrel body 10 in which a transfer space 11 through which the hydrogel is transferred is formed, a pumping unit 60 installed at an upper portion of the barrel body 10 to supply a pressing force to the transfer space 11, a rotation shaft 20 rotatably installed in the conveying space 11 of the barrel body 10, a cutter member 40 installed on the rotation shaft 20 to pulverize the hydrogel transferred through the pressing force generated in the transfer space 11, and a perforated plate 50 installed in the barrel body 10 to discharge the hydrogel pulverized by the cutter member 40 to the outside of the barrel body 10.

The barrel body 10 may be installed in a state in which the transfer space 11 through which the hydrogel is transferred is formed along a longitudinal direction and supported on a bottom surface thereof.

A support base 13 may protrude from a lower portion of the barrel body 10 for being stably supported on the bottom surface thereof.

A discharging part 14 through which hydrogel particles that are pulverized and passed through the perforated plate 50 may be discharged by the cutter member 40 to be described later may be formed at a side of the barrel body 10.

The rotation shaft 20 may be rotatably installed in the inner transfer space 11 of the barrel body 10.

The rotation shaft 20 may be installed to be rotatable in the longitudinal direction of the transfer space 11 inside the barrel body 10. As such, the rotation shaft 20 is installed to provide a rotational force to the cutter member 40 to be described later to properly pulverize the hydrogel.

The rotation shaft 20 may be installed to have a first end thereof connected to a driving shaft of a driving motor 30 so as to be rotatable in one direction or in a reverse direction inside the barrel body 10.

The driving motor 30 is installed at one side of the barrel body 10 in a state in which the driving shaft is connected to a first end of the rotation shaft 20, and thus a rotational driving force may be provided such that the rotation shaft 20 rotates at an appropriate rotational speed in one direction or in a reverse direction depending on an amount of the hydrogel injected into the barrel body 10.

Meanwhile, the cutter member 40 may be installed on the rotation shaft 20.

The cutter member 40, which is rotatably installed at a position of the rotation shaft 20 corresponding to the discharge part 14 formed on the barrel body 10, may be installed to properly pulverize the hydrogel transferred from the transfer space 11 of the barrel body 10 by a pressing force 62 of the pumping unit 60.

The cutter member 40 may be installed to protrude in a circular shape at an end of the rotation shaft 20, and may be installed to appropriately pulverize the hydrogel moving in a direction of the discharge part 14 from the inside of the barrel body 10. The cutter member 40 is exemplarily described to be installed in a protruding state at the end of the rotation shaft 20, but the present invention is not limited thereto, and a plurality of cutter members 40 may be installed to be spaced apart from each other at the end of the rotation shaft 20.

The perforated plate 50 is installed at a position of the barrel body 10 corresponding to the discharge part 14, and a plurality of cutting holes may be formed therein.

Accordingly, the hydrogel pulverized by the cutter member 40 is pressed and moved inside the barrel body 10 by a pressing force generated in the pumping unit 60, thereby being stably discharged through the cutting holes of the perforated plate 50 to perform a cutting process.

Meanwhile, the pumping unit 60 may be installed in the barrel body 10 to provide a pressing force for transferring the hydrogel.

The pumping unit 60 includes a connection passage 61 installed at an upper portion of the barrel body 10 in communication with the transfer space 11, a body portion 63 connected to and fixed to the connection flow path 61, and a rotor portion 65 rotatably installed inside the body portion 63 to provide a pressing force to the connection passage 61.

The connection passage 61 may be installed to have a first side connected to the upper portion of the barrel body 10 and communicates with the transfer space 11, and a second side thereof connected to the body portion 63.

The connection passage 61, which is connected to the body portion 63 in a state of protruding from the upper side of the barrel body 10, may support a state in which the body portion 63 is installed on an upper side of the barrel body 10.

The connection passage 61 may be formed of a steel material to support the body portion 63, or may be connected to the body portion 63 while being installed on a support frame (not illustrated).

The body portion 63, which is installed at an upper portion of the barrel body 10 in a state of being connected to the connection passage 61, may have an installation space in which the rotor portion 65 is installed therein. The body portion 63 may be installed at an upper side of the barrel body 10 in a state of being connected to the connection passage 61 in various shapes such as a cylindrical shape or a polygonal shape.

The connection passage 61 is exemplarily described to be bent to connect the body portion 63 and the barrel body 10 to each other, but may be formed to have a linear shape when an installation position of the pumping unit 60 is changed.

An injection hopper 67 for injecting the hydrogel may be installed at an upper portion of the body portion 63. The injection hopper 67 is not necessarily limited to being installed on the upper side of the body portion 63, and may be installed on a side surface of the body portion 63. In addition, the injection hopper 67 may be installed at a rear side of the body portion 63 when a position of a pumping motor 64 is changed.

Accordingly, the hydrogel may be moved through the connection passage 61 depending on an operation of the rotor portion 65 to be described later to be supplied to the inside of the barrel body 10 in a state of being supplied to the inside of the body portion 63 through the injection hopper 67.

The rotor portion 65, which is installed in the internal installation space of the body portion 63, may be selectively driven depending on an operation control of a user, and may be installed to supply a pumping force to the connection passage 61.

According to the present embodiment, the pumping unit 60 may have the spiral rotor portion 65 rotatably installed inside the body portion 10, to be applied as a type of progressive cavity pump that provides a pumping force that exceeds a pressure of the hydrogel.

The rotor portion 65 may be rotatably installed inside the body portion 63 by a rotational force of the pumping motor 64.

A rotor screw 68 may be installed between the rotor portion 65 and the pumping motor 64.

The rotor screw 68 which is installed inside the body portion 63 may be installed inside the body portion 63 at a position where the input portion 67 is installed to transfer a rotational force of the pumping motor 64 to the rotor portion 65. Accordingly, the hydrogel may be pumped more stably in the pumping unit 60 to be transferred to the inside of the barrel body 10.

As described above, the hydrogel may be pulverized by the cutter member 40 in the state of being supplied through the injection hopper 67 and moved to the inside of the barrel body 10 by the pumping force of the rotor portion 65.

Subsequently, the hydrogel is further moved by the pressing force in the transfer space in the state of being pulverized by the cutter member 40 to be properly cut while passing through the perforated plate 50. Herein, the hydrogel may be cut while being pressed by a uniform pressing force on the entire side surface of the perforated plate 50 by the pumping force of the pumping unit 60 in an operation of being cut in the perforated plate 50.

That is, the hydrogel may be pressed on the side surface of the perforated plate 50 in a state of being completely uniformly filled in the inner space of the barrel body 10 by a pumping pressure of the pumping unit 60. Accordingly, since the hydrogel is uniformly pressed over an entire side area of the perforated plate 50, the hydrogel may be cut in a uniformly pressed state, thereby improving preparing quality of the super absorbent polymer.

FIG. 4 illustrates a schematic exploded side view of main parts showing a minute cutting apparatus for a super absorbent polymer hydrogel using a pump according to a second embodiment of the present invention. The same reference numerals as those of FIG. 1 to FIG. 3 denote the same or similar members having the same or similar functions. Hereinafter, detailed descriptions of the same reference numerals will be omitted.

As illustrated in FIG. 4, a plurality of cutter members 140 and a plurality of perforated plates 150 of the minute cutting apparatus 300 for the super absorbent polymer hydrogel using the pump according to the second embodiment of the present invention may be continuously installed on the rotation shaft 20.

Accordingly, it is possible to pulverize the hydrogel by using the cutter members 140 according to a rotational operation of the rotation shaft 20, so that an effective hydrogel pulverization operation may be performed.

FIG. 5 illustrates a schematic perspective view of a minute cutting apparatus for a super absorbent polymer hydrogel using a pump according to a third embodiment of the present invention. The same reference numerals as those of FIG. 1 to FIG. 4 denote the same or similar members having the same or similar functions. Hereinafter, detailed descriptions of the same reference numerals will be omitted.

As illustrated in FIG. 5, a display window 210 capable of confirming a connection passage may be installed in the minute cutting apparatus 300 for the super absorbent polymer hydrogel using the pump according to the second embodiment of the present invention.

Accordingly, it is possible to easily check an abnormal closing state due to clogging of the connection passage 61 and a moving state of the hydrogel, so that quick troubleshooting may be performed.

FIG. 6 illustrates a schematic perspective view of a minute cutting apparatus for a super absorbent polymer hydrogel using a pump according to a fourth embodiment of the present invention. The same reference numerals as those of FIG. 1 to FIG. 5 denote the same or similar members having the same or similar functions. Hereinafter, detailed descriptions of the same reference numerals will be omitted.

As illustrated in FIG. 6, a pressure sensor 310 for sensing whether an internal pressure of the connection passage 61 is within a predetermined pressure range may be installed in the minute cutting apparatus 400 for the super absorbent polymer hydrogel using the pump according to the third embodiment of the present invention.

The pressure sensor 310 may be installed to warn a user by recognizing a closed state such as clogging or a damaged state such as perforation when the internal pressure of the connection passage 61 is sensed as an abnormal pressure that exceeds a predetermined pressure. Accordingly, it is possible to quickly troubleshoot an abnormal operation and extend a service life.

FIG. 7 illustrates a schematic perspective view of a minute cutting apparatus for a super absorbent polymer hydrogel using a pump according to a fifth embodiment of the present invention. The same reference numerals as those of FIG. 1 to FIG. 6 denote the same or similar members having the same or similar functions. Hereinafter, detailed descriptions of the same reference numerals will be omitted.

As illustrated in FIG. 7, a pumping unit 60 of the minute cutting apparatus 500 for the super absorbent polymer hydrogel using the pump according to the fourth embodiment of the present invention may be installed at a side surface of the barrel body 10, and the connection passage 61 may be connected to the side surface of the barrel body 10.

Accordingly, the hydrogel may be supplied from the side surface of the barrel body 10 to the inside of the barrel body 10. In the present embodiment, the connection passage 61 is exemplarily described to be connected to the side surface of the barrel body 10, but it may be connected to a rear position of the barrel body 10 when a position of the driving motor 30 is changed.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS 10 barrel body
11 transfer space
13 support base
20 rotation shaft
30 driving motor
40, 140 cutter member
50, 150 perforated plate
60 pumping unit
61 connection passage
63 body portion
64 pumping motor
65 rotor portion
67 injection hopper
68 rotor screw
210 display window
310 pressure sensor

What is claimed is:

1. A minute cutting apparatus for a superabsorbent polymer hydrogel using a pump, comprising:
    a barrel body comprising a transfer space through which the superabsorbent polymer hydrogel is transferred;
    a pumping unit in the barrel body to supply a pressing force to the transfer space;
    a rotation shaft which rotates in the transfer space of the barrel body;
    a driving motor configured to provide a rotational driving force to the rotation shaft;
    a plurality of cutter members attached to the rotation shaft configured to pulverize the superabsorbent polymer hydrogel transferred by the pressing force in the transfer space, the plurality of cutter members being parallel from each other; and
    a plurality of perforated plates located in the transfer space of the barrel body to discharge the superabsorbent polymer hydrogel pulverized by the plurality of cutter members to an outside of the barrel body, the plurality of perforated plates being parallel from each other and parallel to the plurality of cutter members,
    wherein the plurality of cutter members and the plurality of perforated plates are alternately disposed in the barrel body,
    wherein the pressing force is supplied from an upper portion of the barrel body into inside of the transfer space,
    wherein the pumping unit includes:
        a connection passage connected to the upper portion of the barrel body to be in communication with the transfer space;
        a body portion attached to a side of the connection passage that is an opposite side of the connection passage to which the barrel body is attached; and
        a spiral rotor portion located inside the body portion and configured to provide the pressing force to the connection passage,
    wherein the minute cutting apparatus further comprises a rotor screw in the body portion to transfer rotational force to the spiral rotor portion.

2. The minute cutting apparatus of claim 1, further comprising an injection hopper into which the superabsorbent polymer hydrogel is injected and located at an upper portion of the body portion.

3. The minute cutting apparatus of claim 1, further comprising a display window capable of checking an inside located at the connection passage.

4. The minute cutting apparatus of claim 1, further comprising a pressure sensor located at the connection passage to check whether or not an internal pressure is within a predetermined pressure range.

5. The minute cutting apparatus of claim 1, wherein the connection passage is bent to connect the body portion and the barrel body.

6. The minute cutting apparatus of claim 1, wherein the spiral rotor portion is selectively driven depending on an operation control of a user.

7. The minute cutting apparatus of claim 1, wherein the connection passage comprises a steel material and supports the body portion.

8. The minute cutting apparatus of claim 1, wherein the connection passage is installed on a support frame.

9. The minute cutting apparatus of claim 1, wherein the connection passage has a linear shape.

10. The minute cutting apparatus of claim 1, wherein the connection passage is connected to a side surface of the barrel body.

11. The minute cutting apparatus of claim 1, wherein the connection passage is connected to a rear position of the barrel body.

* * * * *